| (12) | United States Patent | (10) Patent No.: | US 9,524,594 B2 |
|---|---|---|---|
| | Ouyang et al. | (45) Date of Patent: | Dec. 20, 2016 |

(54) MOBILE ACCESS CONTROL SYSTEM AND METHOD

(71) Applicant: Honeywell International Inc., Morristown, NJ (US)

(72) Inventors: Li Ouyang, Shanghai (CN); Sheng Yi, Shanghai (CN); Chen Chen, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 189 days.

(21) Appl. No.: 14/152,342

(22) Filed: Jan. 10, 2014

(65) Prior Publication Data

US 2015/0199859 A1   Jul. 16, 2015

(51) Int. Cl.

| G05B 19/00 | (2006.01) |
|---|---|
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| H04B 1/00 | (2006.01) |
| H04B 1/38 | (2015.01) |
| H04B 3/00 | (2006.01) |
| H04Q 1/00 | (2006.01) |
| G07C 9/00 | (2006.01) |
| H04L 9/14 | (2006.01) |

(52) U.S. Cl.
CPC ....... *G07C 9/00111* (2013.01); *G07C 9/00103* (2013.01); *G07C 9/00571* (2013.01); *H04L 9/14* (2013.01); *H04L 2209/24* (2013.01)

(58) Field of Classification Search
None
See application file for complete search history.

(56) References Cited

U.S. PATENT DOCUMENTS

| 2002/0116268 A1* | 8/2002 | Fukuda | G06Q 30/02 |
|---|---|---|---|
| | | | 709/201 |
| 2005/0060555 A1* | 3/2005 | Raghunath | G07C 9/00309 |
| | | | 713/186 |

(Continued)

FOREIGN PATENT DOCUMENTS

EP   1 536 306 A1   6/2005

OTHER PUBLICATIONS

Extended European search report from corresponding EP application 15150349.7, dated May 15, 2015.

*Primary Examiner* — Quang D Pham
(74) *Attorney, Agent, or Firm* — Husch Blackwell LLP

(57) ABSTRACT

An apparatus is provided that includes an access door of a secured area, a lock that controls access into the secured area through the door, a controller coupled to the lock, and a portable wireless device proximate the door, wherein the portable wireless device wirelessly retrieves an identifier from the door and wirelessly transfers the identifier of the door and a personal identifier of a person carrying the portable wireless device to the controller, and wherein the controller compares the received personal identifier with a list of identifiers of persons authorized to enter the secured area, determines that the received personal identifier matches an identifier of the list of identifiers, and activates the lock, thereby allowing physical entry by the person into the secured area.

20 Claims, 3 Drawing Sheets

(56) References Cited

U.S. PATENT DOCUMENTS

| | | | |
|---|---|---|---|
| 2007/0074024 A1* | 3/2007 | Cheong | G06Q 30/02 713/171 |
| 2008/0301307 A1* | 12/2008 | Son | G06F 17/30876 709/228 |
| 2010/0148919 A1* | 6/2010 | Roberts | G07C 9/00111 340/5.2 |
| 2010/0201482 A1* | 8/2010 | Robertson | G07C 9/00111 340/5.61 |
| 2011/0258443 A1* | 10/2011 | Barry | G06F 21/31 713/168 |
| 2012/0077468 A1* | 3/2012 | Fan | G07C 9/00309 455/414.1 |
| 2013/0214898 A1* | 8/2013 | Pineau | G06F 21/32 340/5.6 |
| 2013/0221094 A1* | 8/2013 | Smith | G07C 9/00309 235/382 |
| 2013/0222583 A1* | 8/2013 | Earnshaw | H04N 21/47202 348/143 |
| 2013/0303085 A1* | 11/2013 | Boucher | H04W 4/008 455/41.1 |
| 2013/0331027 A1* | 12/2013 | Rose | H04W 12/06 455/41.1 |
| 2014/0091902 A1* | 4/2014 | Domsten | G06Q 10/08 340/5.8 |
| 2014/0136652 A1* | 5/2014 | Narayanaswami | H04L 67/02 709/217 |
| 2014/0145823 A1* | 5/2014 | Aase | G07C 9/00309 340/5.61 |
| 2014/0255036 A1* | 9/2014 | Jovicic | H04B 10/116 398/115 |
| 2014/0266585 A1* | 9/2014 | Chao | G07C 9/00111 340/5.61 |
| 2015/0172925 A1* | 6/2015 | Leppanen | H04W 12/04 726/7 |
| 2015/0199684 A1* | 7/2015 | Maus | G06Q 20/3829 705/71 |
| 2015/0279130 A1* | 10/2015 | Robertson | G07C 9/00571 340/5.61 |
| 2015/0279132 A1* | 10/2015 | Perotti | G07C 9/00103 340/5.52 |
| 2015/0287256 A1* | 10/2015 | Davis | G07C 9/00857 340/5.25 |

* cited by examiner

MOBILE ACCESS CONTROL SYSTEM AND METHOD

FIELD

The field relates to secured areas and, more particularly, to methods of accessing secured areas.

BACKGROUND

Security systems used for the protection of secured areas are known. Such systems typically rely upon a fence or barrier around a secured area with one or more portals (e.g., doors, windows, etc.) that allow access by authorized persons into the secured area.

Each of the portals may have a sensor (e.g., a limit switch) connected to the door or window that detects opening of the door or window by an intruder. The sensors may be monitored by a local control panel. Upon activation of one of the sensors, the control panel may activate a local alarm that notifies persons within the secured area of the threat.

The control panel may include a user interface that controls arming and disarming of the security system. The user interface may be located on the control panel or near an entrance to the secured area.

In order to avoid false alarms, the control panel may have a built-in delay that begins after detection of opening of the door or window and before activation of the alarm. This delay may be used by an authorized person to disarm the security system through the user interface.

In more sophisticated security systems, an authorized user may use an access card in conjunction with a card reader to both open the door and deactivate the security system. However, access cards may be duplicated and card readers are subject to damage by criminals. Accordingly, better methods are needed to allow access into secured areas by authorized persons.

DETAILED DESCRIPTION OF AN ILLUSTRATED EMBODIMENT

Figure 1:
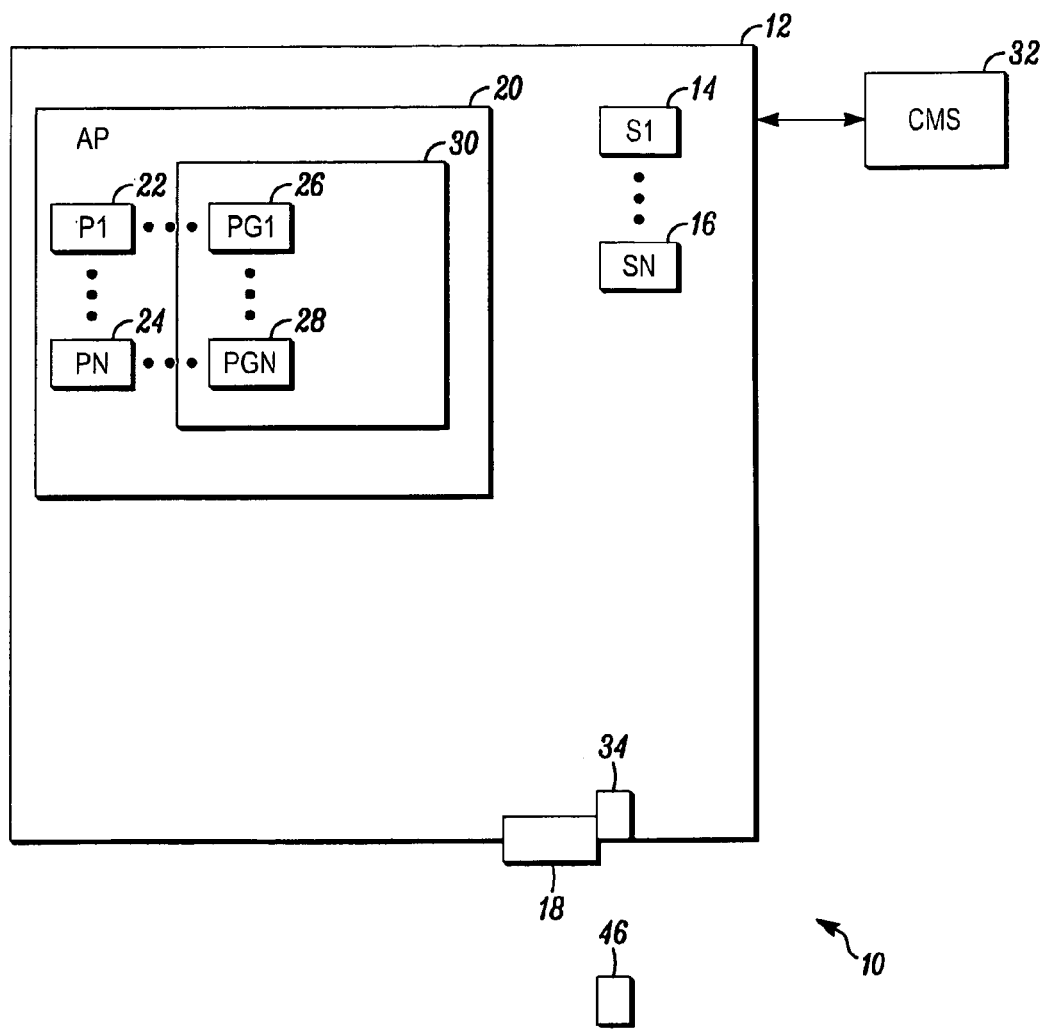
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

FIG. 1 is a security system 10 shown generally in accordance with an illustrated embodiment. Included within the security system may be a number of sensors 14, 16 that protect a secured area 12.

Located along a periphery of the secured area may be one or more doors 18 that provide access into and egress from the secured area by authorized persons. The doors may be monitored by one or more of the sensors.

The sensors may be monitored by a control panel 20. Upon activation of one of the sensors, the control panel may send an alarm message to a central monitoring station 32. The central monitoring station may respond by summoning the police.

Included within the control panel may be one or more processor apparatus (processors) 22, 24 each operating under control of one or more computer programs 26, 28 loaded from a non-transient computer readable medium (memory) 30. As used herein, reference to a step of a program is also reference to the processor that executed that step.

During normal operation, one or more alarm processors of the alarm panel may monitor the status of each of the sensors. Upon activation of one of the sensors, the alarm processor may compose an alarm message including an identifier of the sensor, an identifier of the alarm system and a time. The composed message, in turn, is sent to the central monitoring station.

The alarm panel may also control access by authorized persons into the secured area via the one or more doors. An access processor of the alarm panel (or door) may control one or more access control subsystems 34 located on or associated with the door. One of the features of the access control subsystem is a transceiver near the door that detects a portable wireless device 46 carried by an authorized person. The access processor may receive information through the transceiver of the subsystem from the wireless device that confirms the identity of the authorized user and door. Upon confirming the identity, the access processor may activate an electrically operated lock on the door in order to open the door. The access processor may also cancel any alarm activated by the opening of that door.

Figure 2:
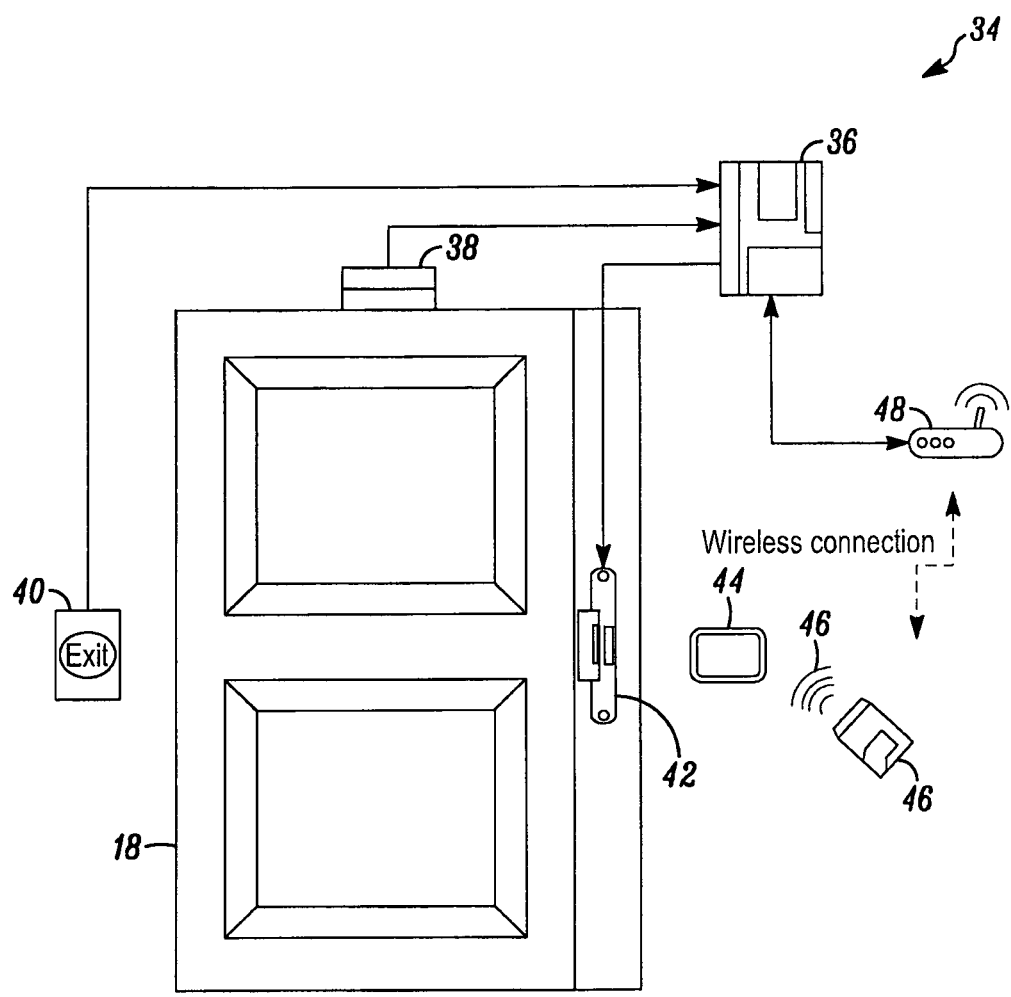
FIG. 2 depicts a door of the system of FIG. 1.
Figure 3:
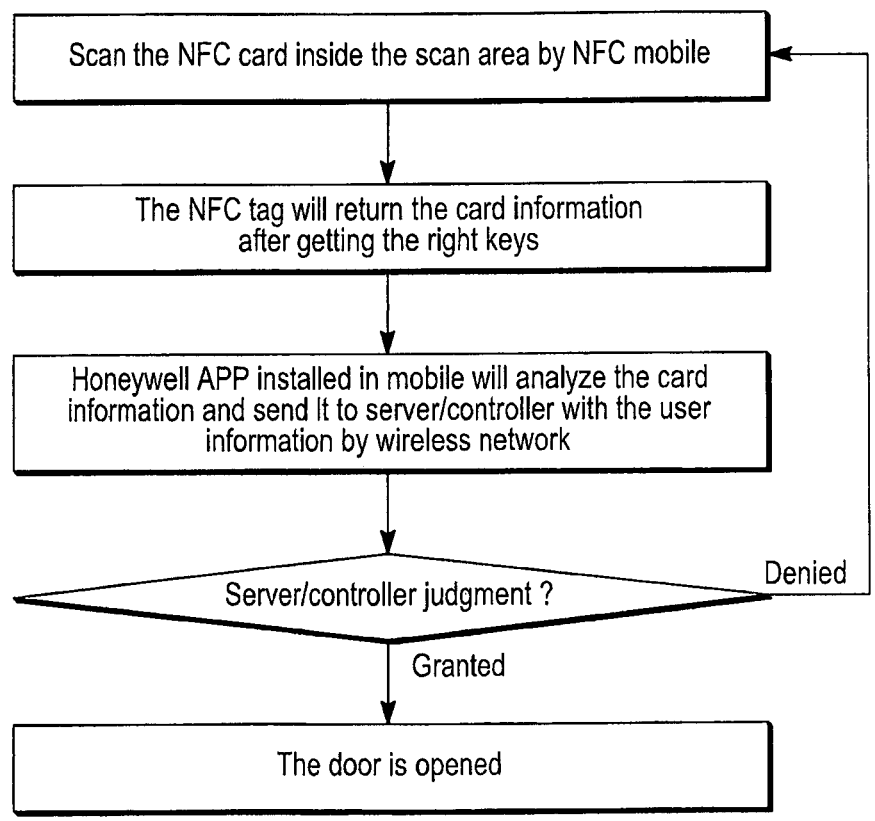
FIG. 3 is a flow chart of steps that may be used by the system of FIG. 1.

FIG. 2 is a simplified block diagram of the door and an access control subsystem. The access control subsystem may include a local field control panel 36, a door sense switch 38, an exit button 40, an electronic strike lock control 42, a, NFC tag 44, an NFC mobile 46, and a wireless access point 48. In this regard, the field control panel 36 may be incorporated into the alarm panel 20 of FIG. 1 or may be a separate panel as shown in FIG. 2. Similarly, the door sensor 38 detects opening of the door and may be a separate sensor or may be one of the group of sensors 14, 16 shown in FIG. 1.

The electronic strike may be an electrically operated lock. Activation of the electronic strike allows persons to enter (or exit) the secured area.

The exit button may be located inside the secured area and may be used by authorized persons inside the secured area in order to exit. Activation of the exit button may activate the door lock.

The NFC tag may be a near field communication (NFC) tag as defined by the NFC forum. Alternatively, the NFC tag may be a radio frequency identification tag (RFID). Alternatively, the NFC tag may be an RFID card that uses an NFC protocol. The NFC tag may be embedded or otherwise hidden within a door frame or other location proximate the door.

The NFC tag contains a data file including a coded identifier of the door and of the security system. The identifier of the security system may be an IP address. The data file is encrypted using one or more public and private keys.

The NFC mobile may be any portable wireless device capable of activating the NFC tag. The NFC mobile may be a cellphone, smartphone, PDA, or portable computer.

Under the illustrated embodiment, the portable wireless device includes an access program executing on an access request processor within the portable wireless device. The access program (processor) operates to exchange information with the access control subsystem in order to gain access to the secured area. To initiate access into the secured area, the authorized user may activate an access button shown on a screen of the device.

In response, the wireless device transmits a wireless entry request message or signal 46 to the NFC card. The wireless signal may include an identifier of the wireless device or an identifier of the wireless device and security system. The signal is received by the NFC card and provides power to the NFC card. In one preferred embodiment, the NFC card simply transmits the encrypted file back to the wireless device. Under a more preferred embodiment, a processor within the NFC card compares the identifier of the security system or security system and user with one or more authorized identifiers. If the identifier(s) match, the NFC card transmits the encrypted file back to the wireless device.

Under one particularly preferred embodiment, the portable wireless device operates under a reader/writer mode as defined by the NFC forum. Under this embodiment, the entry request message and return of the encrypted file may occur under a predetermined NFC protocol of request and response messages defined by the specifications of the NFC forum.

Located within the wireless device is a file containing the one or more public and private keys that may be used by the access processor or a separate decoding processor within the portable device to decode the received encrypted file. The access processor decrypts the file using the one or more public and private keys to recover the identifier of the door and of the security system.

Once the access processor has the door identifier and identifier of the security system, a communication processor of the wireless device composes an access request including the user's identifier, the identifier of the door, and the identifier of the security system. The wireless identifier transmits the access request to a corresponding access verification processor of the controller 36 (or 20) through the wireless access point.

The access verification processor may decode the access request and first confirm that the security system identifier from the portable device matches that of the security system and that the identifier of the user is an authorized user of the security system. The processor may do this by comparing the identifier of the requesting person with a list of authorized persons located within a memory of the processor. The processor may also confirm that the door identifier is part of the security system, again, by matching the identifier with a list of door identifiers.

Upon confirming the security system and door identifiers and that the user of the wireless device is an authorized user, the access verification processor may compose and send an activating message to the lock 42. Upon receipt of the message, the lock may open the door, and the user may enter the secured area.

In general, the system includes an access door of a secured area, a lock that controls access into the secured area through the door, a controller coupled to the lock, and a portable wireless device proximate the door, wherein the portable wireless device wirelessly retrieves an identifier from the door and wirelessly transfers the identifier of the door and a personal identifier of a person carrying the portable wireless device to the controller, and wherein the controller compares the received personal identifier with a list of identifiers of persons authorized to enter the secured area, determines that the received personal identifier matches an identifier of the list of identifiers and activates the lock, thereby allowing physical entry by the person into the secured area.

Alternatively, the system includes a security system that protects a secured area, an access door of the secured area, a lock that controls access into the secured area through the door, a controller coupled to the lock, a radio frequency identification (RFID) card permanently located near the access door containing an identifier of the door, a portable wireless device, and a wireless access port, wherein the portable wireless device wirelessly recovers the identifier of the door directly from the RFID card, wherein the portable wireless device wirelessly transfers the identifier of the door and a personal identifier of a person carrying the portable wireless device to the controller through the wireless access port, and wherein the controller compares the received personal identifier with a list of identifiers of persons authorized to enter the secured area, determines that the received personal identifier matches an identifier of the list of identifiers, and activates the lock, thereby allowing physical entry by the person into the secured area.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A security system for providing physical entry by a person into a secured area, the security system comprising:
   an access door of the secured area;
   a lock that controls access into the secured area through the access door;
   a controller coupled to the lock;
   a radio frequency identification (RFID) card permanently located near the access door containing an identifier of the access door and an identifier of the security system;
   a portable wireless device, carried by the person proximate to the access door, that transmits a wireless entry request message or signal to the RFID card in response to activating, by the person, an access button on a screen of the portable wireless device, wherein the wireless entry request message or signal includes an identifier of the portable wireless device and the identifier of the security system; and
   a processor within the RFID card that compares the identifier of the portable wireless device and the identifier of the security system with one or more authorized identifiers, and, if both the identifier of the portable wireless device and the identifier of the security system match with the one or more authorized identifiers, wirelessly transmits an encrypted file including the identifier of the security system and the identifier of the access door back to the portable wireless device,
   wherein the portable wireless device decodes the identifier of the access door and the identifier of the security system from the encrypted file and wirelessly transfers an access request including the identifier of the access door, the identifier of the security system, and a personal identifier of the person carrying the portable wireless device to an access processor of the controller, and
   wherein the controller decodes the access request, compares the personal identifier of the person with a list of identifiers of persons authorized to enter the secured area of the security system, determines that the personal identifier of the person matches an identifier in the list of identifiers, confirms the identifier of the access door being part of the security system by matching the identifier of the access door with a list of door identifiers, and sends an activating message to the lock to activate the lock, thereby allowing physical entry by the person into the secured area in response to confirming the identifier of the security system, the identifier of the access door, and that the person carrying the portable wireless device is an authorized person.

2. The security system as in claim 1 wherein the controller further comprises the security system.

3. The security system as in claim 1 further comprising a wireless access point in communication with the controller that wirelessly connects the portable wireless device to the controller.

4. The security system as in claim 1 further comprising a processor of the portable wireless device that uses a near field communication protocol to exchange information with the RFID card and to recover the identifier of the access door and the identifier of the security system.

5. The security system as in claim 4 further comprises a decryption processor of the portable wireless device that decrypts the encrypted file from the RFID card using one or more encryption keys to recover the identifier of the access door and the identifier of the security system.

6. The apparatus as in claim 1 wherein the RFID card is embedded in a frame of the access door.

7. A security system for providing physical entry by a person into a secured area, the security system comprising:
an access door of the secured area;
a lock that controls access into the secured area through the access door;
a controller coupled to the lock;
a radio frequency (RF) card permanently located near the access door containing an identifier of the access door and an identifier of the security system;
a portable wireless device, carried by the person proximate to the access door, that transmits a wireless entry request message or signal to the RF card in response to activating, by the person, an access button on a screen of the portable wireless device, wherein the wireless entry request message or signal includes an identifier of the portable wireless device and the identifier of the security system; and
a processor within the RF card that compares the identifier of the portable wireless device and the identifier of the security system with one or more authorized identifiers, and, if both the identifier of the portable wireless device and the identifier of the security system match with the one or more identifiers, wirelessly transmits an encrypted file including the identifier of the access door and the identifier of the security system back to the portable wireless device proximate the access door,
wherein the portable wireless device retrieves the identifier of the access door and the identifier of the security system from the encrypted file and wirelessly transfers an access request including the identifier of the access door, the identifier of the security system, and a personal identifier of the person carrying the portable wireless device to an access processor of the controller, and
wherein the controller decodes the access request, compares the personal identifier of the person with a list of identifiers of persons authorized to enter the secured area of the security system, determines that the personal identifier of the person matches an identifier in the list of identifiers, confirms the identifier of the access door being part of the security system by matching the identifier of the access door with a list of door identifiers, and sends an activating message to the lock to activate the lock, thereby allowing physical entry by the person into the secured area in response to confirming the identifier of the security system, the identifier of the access door, and that the person carrying the portable wireless device is an authorized person.

8. The security system as in claim 7 wherein the RF card further comprises a radio frequency identification (RFID) card located proximate the access door that provides the identifier of the access door and the identifier of the security system to the portable wireless device.

9. The security system as in claim 8 wherein the RFID card further comprises the encrypted file containing the identifier of the access door and the identifier of the security system.

10. The security system as in claim 9 wherein the RFID card further comprises a near field communication (NFC) card.

11. The security system as in claim 10 further comprising a processor of the portable wireless device that operates under a near field communication (NFC) protocol.

12. The security system as in claim 11 wherein the portable wireless device further comprises one or more of a private key or public and private encryption keys saved in a memory of the portable wireless device.

13. The security system as in claim 12 further comprising a decryption key that decodes the identifier of the access door and the identifier of the security system from the encrypted file retrieved from the NFC card.

14. The security system as in claim 7 wherein the controller further comprises the security system.

15. The security system as in claim 7 further comprising a wireless access point in communication with the controller that wirelessly connects the portable wireless device to the controller.

16. A security system for providing physical entry by a person into a secured area, the security system comprising:
an access door of the secured area;
a lock that controls access into the secured area through the access door;
a controller coupled to the lock;
a radio frequency identification (RFID) card permanently located near the access door containing an identifier of the access door and an identifier of the security system;
a portable wireless device, carried by the person proximate to the access door, that transmits a wireless entry request message or signal to the RFID card in response to activating, by the person, an access button on a screen of the portable wireless device, wherein the wireless entry request message or signal includes an identifier of the portable wireless device and the identifier of the security system; and
a processor within the RFID card that compares the identifier of the portable wireless device and the identifier of the security system with one or more authorized identifiers, and, if both the identifier of the portable wireless device and the identifier of the security system match with the one or more authorized identifiers, wirelessly transmits an encrypted file back to the portable wireless device including the identifier of the access door and the identifier of the security system, wherein the portable wireless device decodes the identifier of the access door and the identifier of the security system from the encrypted file; and a wireless access port, wherein the portable wireless device wirelessly transfers an access request including the identifier of the access door, the identifier of the security system, and a personal identifier of a person carrying the portable wireless device to an access processor of the controller through the wireless access port, wherein the controller decodes the access request, compares the personal identifier of the person with a list of identifiers of persons authorized to enter the secured area of the security system, determines that the personal identifier of the person matches an identifier in the list of identifiers, confirms the identifier of the access door being part of the security system by matching the identifier of the access door with a list of door identifiers, and sends an activating message to the lock to activate the lock, thereby allowing physical entry by the person into the secured area in response to confirming the identifier of the security system, the identifier of the access door, and that the person carrying the portable wireless device is an authorized person.

17. The security system as in claim 16 wherein the RFID card further comprises a near field communication (NFC) card.

18. The security system as in claim 17 wherein a processor of the portable wireless device exchanges messages with the NFC card under a NFC protocol.

19. The security system as in claim 16 wherein the RFID card further comprises the identifier of the access door and the identifier of the security system encrypted with one or more of a private key and public and private keys.

20. The security system as in claim 19 wherein the portable wireless device further comprises the one or more of the private key and the public and private keys saved in a memory of the portable wireless device that are used to decrypt the identifier of the access door and the identifier of the security system.

* * * * *